US009927836B2

(12) United States Patent
Clark et al.

(10) Patent No.: US 9,927,836 B2
(45) Date of Patent: Mar. 27, 2018

(54) ELECTRICITY GENERATOR

(71) Applicant: Unruly, LLC, Portland, OR (US)

(72) Inventors: Jim Clark, Portland, OR (US); Gary A. McRobert, Portland, OR (US); Mathew Laibowitz, Los Angeles, CA (US)

(73) Assignee: Unruly, LLC, Portland, OR (US)

( * ) Notice: Subject to any disclaimer, the term of this patent is extended or adjusted under 35 U.S.C. 154(b) by 272 days.

(21) Appl. No.: 14/419,462

(22) PCT Filed: Mar. 7, 2013

(86) PCT No.: PCT/US2013/029700
§ 371 (c)(1),
(2) Date: Feb. 3, 2015

(87) PCT Pub. No.: WO2014/051676
PCT Pub. Date: Apr. 3, 2014

(65) Prior Publication Data
US 2015/0185771 A1    Jul. 2, 2015

Related U.S. Application Data

(60) Provisional application No. 61/705,558, filed on Sep. 25, 2012.

(51) Int. Cl.
*H02J 7/00*     (2006.01)
*G06F 1/16*     (2006.01)
*H02K 7/18*     (2006.01)
*F03G 5/06*     (2006.01)
*H02K 7/116*    (2006.01)

(52) U.S. Cl.
CPC ............ *G06F 1/1628* (2013.01); *F03G 5/06* (2013.01); *G06F 1/1626* (2013.01); *G06F 1/1635* (2013.01); *H02J 7/0044* (2013.01); *H02K 7/116* (2013.01); *H02K 7/1861* (2013.01); *Y10T 307/367* (2015.04)

(58) Field of Classification Search
CPC .................................................. H02J 3/1885
USPC ........................................................ 320/137
See application file for complete search history.

(56) References Cited

U.S. PATENT DOCUMENTS 2,195,328 A    3/1940  Eaton
3,219,861 A    11/1965 Burr
(Continued)

FOREIGN PATENT DOCUMENTS

WO   WO 2007/121382   10/2007

*Primary Examiner* — Nathaniel Pelton
*Assistant Examiner* — Johali Torres Ruiz
(74) *Attorney, Agent, or Firm* — Klarquist Sparkman, LLP

(57) ABSTRACT

The present application concerns handheld electrical generators for charging mobile electronic devices. In one representative embodiment, a manually powered generator for charging a mobile device comprises a first magnet array having a plurality of magnets arrayed in an annular formation on a first surface, a second magnet array having a plurality of magnets arrayed in an annular formation on a second surface positioned opposite the first surface, and a torque input member. The generator further comprises a rotor having a serpentine trace of conductive material disposed between the first and second magnet arrays. The generator is configured to be incorporated into a handheld case or shell for containing the mobile device.

29 Claims, 9 Drawing Sheets

(56) References Cited

U.S. PATENT DOCUMENTS

| | | | |
|---|---|---|---|
| 3,858,071 A | | 12/1974 | Griffing et al. |
| 5,650,681 A | | 7/1997 | DeLerno |
| 5,721,461 A | | 2/1998 | Taylor |
| 5,977,684 A | * | 11/1999 | Lin ........................ H02K 21/12 310/178 |
| 6,181,048 B1 | | 1/2001 | Smith et al. |
| 6,288,463 B1 | | 9/2001 | Tada et al. |
| 6,998,751 B2 | | 2/2006 | Lopatinsky |
| 7,222,984 B2 | | 5/2007 | Lee |
| 7,245,042 B1 | | 7/2007 | Simnacher |
| 7,276,805 B2 | | 10/2007 | Poon |
| 7,485,992 B2 | * | 2/2009 | Ekchian ............... H02K 7/1861 310/268 |
| 8,164,228 B1 | * | 4/2012 | Botts ......................... H02J 7/14 310/178 |
| 8,248,025 B2 | | 8/2012 | Sip |
| 2004/0090210 A1 | * | 5/2004 | Becker .................... F21L 13/06 322/1 |
| 2004/0153677 A1 | | 8/2004 | Liao |
| 2005/0029899 A1 | * | 2/2005 | Irving .................... H02K 21/24 310/268 |
| 2007/0182367 A1 | * | 8/2007 | Partovi .................. H01F 5/003 320/108 |
| 2008/0057895 A1 | | 3/2008 | Hsu |
| 2008/0238238 A1 | | 10/2008 | Sprain |
| 2011/0063059 A1 | | 3/2011 | Takahashi et al. |
| 2012/0112470 A1 | * | 5/2012 | Torino ............... A63B 21/0053 290/1 R |
| 2012/0264491 A1 | * | 10/2012 | Singhal .................. H04M 1/21 455/575.1 |
| 2013/0002066 A1 | * | 1/2013 | Long ...................... H02K 21/24 310/54 |

\* cited by examiner

ELECTRICITY GENERATOR

CROSS REFERENCE TO RELATED APPLICATIONS

The present application is the U.S. National Stage of International Application No. PCT/US2013/029700, filed Mar. 7, 2013, which was published in English under PCT Article 21(2), which in turn claims the benefit of U.S. Provisional Application No. 61/705,558, filed Sep. 25, 2013, which is incorporated herein by reference in its entirety.

FIELD

The present application concerns handheld electrical generators for charging mobile electronic devices.

BACKGROUND

Mobile electronic devices such as cellphones, tablets, personal computers, etc., have a finite battery life and must be periodically recharged. In circumstances where electrical power is available, and the user possesses the correct power adapter unit or charger, a low battery poses little threat to continued use of the device. However, in circumstances where electrical power is not readily available, or the user does not have a charger, a low battery can cause the user to lose the functionality of the device in potentially critical situations, such as emergencies. Accordingly, a portable and compact device for manually generating electrical power for a mobile electronic device is desirable.

SUMMARY

Several embodiments of devices and methods are shown and described herein directed to handheld electrical generators for charging mobile electronic devices. The disclosed embodiments are especially useful for manually generating electrical power for mobile electronic devices when electrical power or conventional power adapter units are unavailable. In one representative embodiment, a manually powered generator for charging a mobile device comprises a first magnet array having a plurality of magnets arrayed in an annular formation on a first surface, a second magnet array having a plurality of magnets arrayed in an annular formation on a second surface positioned opposite the first surface, and a torque input member. The generator further comprises a rotor having a serpentine trace of conductive material disposed between the first and second magnet arrays. The generator is also configured to be incorporated into a handheld case or shell for containing the mobile device, thereby eliminating the need for cables to connect the generator to the device.

In another representative embodiment, a case for a handheld mobile electronic device comprises an electrical generator that is manually powered and configured to transfer electrical power to the mobile device. The electrical generator is incorporated into the case such that the thickness of the case is substantially less than or equal to the thickness of the mobile device such that the portability and pocket-sized nature of the mobile device is uncompromised.

Another representative embodiment comprises a method of charging a mobile device. The method comprises providing a case for a mobile device having an electrical generator in communication with the mobile device. The electrical generator has a torque input member interconnected with a rotor by a gear assembly, and one or more magnets disposed adjacent the rotor. The torque input member is rotated, and rotational frequency of the torque input member is multiplied with the gear assembly. The rotor is rotated adjacent the magnets at the multiplied rotational frequency to generate electrical current; and the electrical current is conducted away from the rotor and into the mobile device. The electrical generator has a thickness of less than one centimeter and is configured to generate a continuous electrical output of from about two to about five watts when the torque input member is rotated at from about 60 to about 100 RPM.

The foregoing and other objects, features, and advantages of the invention will become more apparent from the following detailed description, which proceeds with reference to the accompanying figures.

DETAILED DESCRIPTION

Disclosed herein are embodiments of a compact, mechanically driven electricity generator that can be used, for example, to charge a mobile electronic device.

Figure 1:
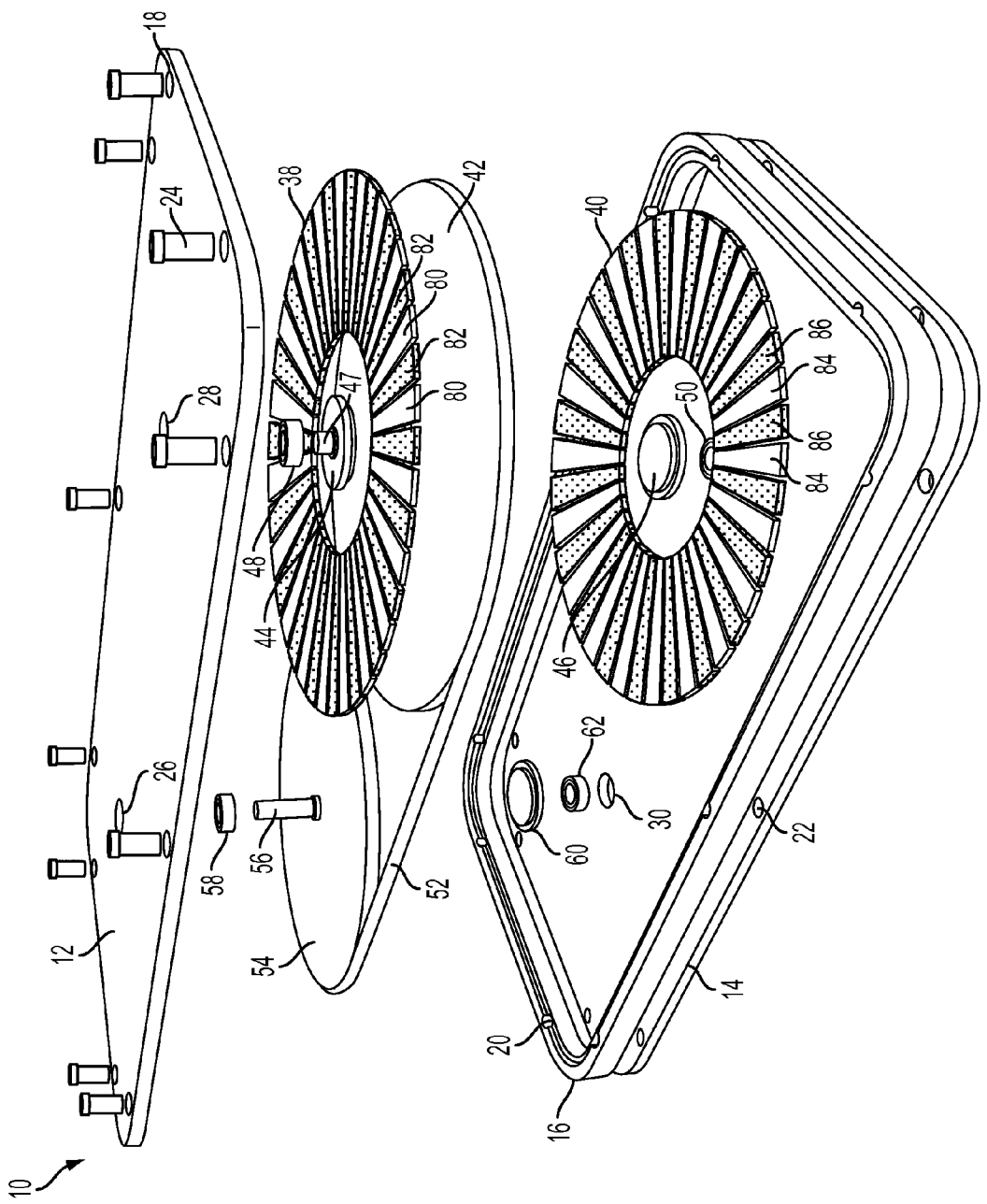
FIG. 1 is an exploded view of a portion of an exemplary electricity generator disclosed herein.

FIG. 1 is an exploded view of an exemplary embodiment of a generator 10, with some components not shown. The generator 10 comprises an outer enclosure that includes a first plate 12, a second plate 14, and an annular separator 16 between the two plates. The enclosure can be secured together by a plurality of fasteners 24 that pass through holes 18 in the first plate 12, holes 20 in the separator 16, and holes 22 in the second plate 14. The enclosure can be generally rectangular and have an overall thickness of less than about 7 mm thick, providing a slim form factor and light weight. In some embodiments, the dimensions of the enclosure can roughly correspond to the dimensions of the device. The small size can allow the generator 10 to be portable, handheld and/or hand-operated, and allows the generator to be attachable directly to an electrical device (such as a mobile phone, a tablet, a laptop, GPS device, other portable or mobile electronic devices, and/or devices with rechargeable batteries) for supplying electricity to the device.

As also shown in FIGS. 1-2 and 3A-B, within the enclosure, the generator 10 can comprise a first circular array of permanent magnets 38 fixed on the inner surface of the first plate 12, a second circular array of permanent magnets 40 fixed on the inner surface of the second plate 14, and a circular rotor 42 mounted between the two arrays of magnets.

Figure 2:
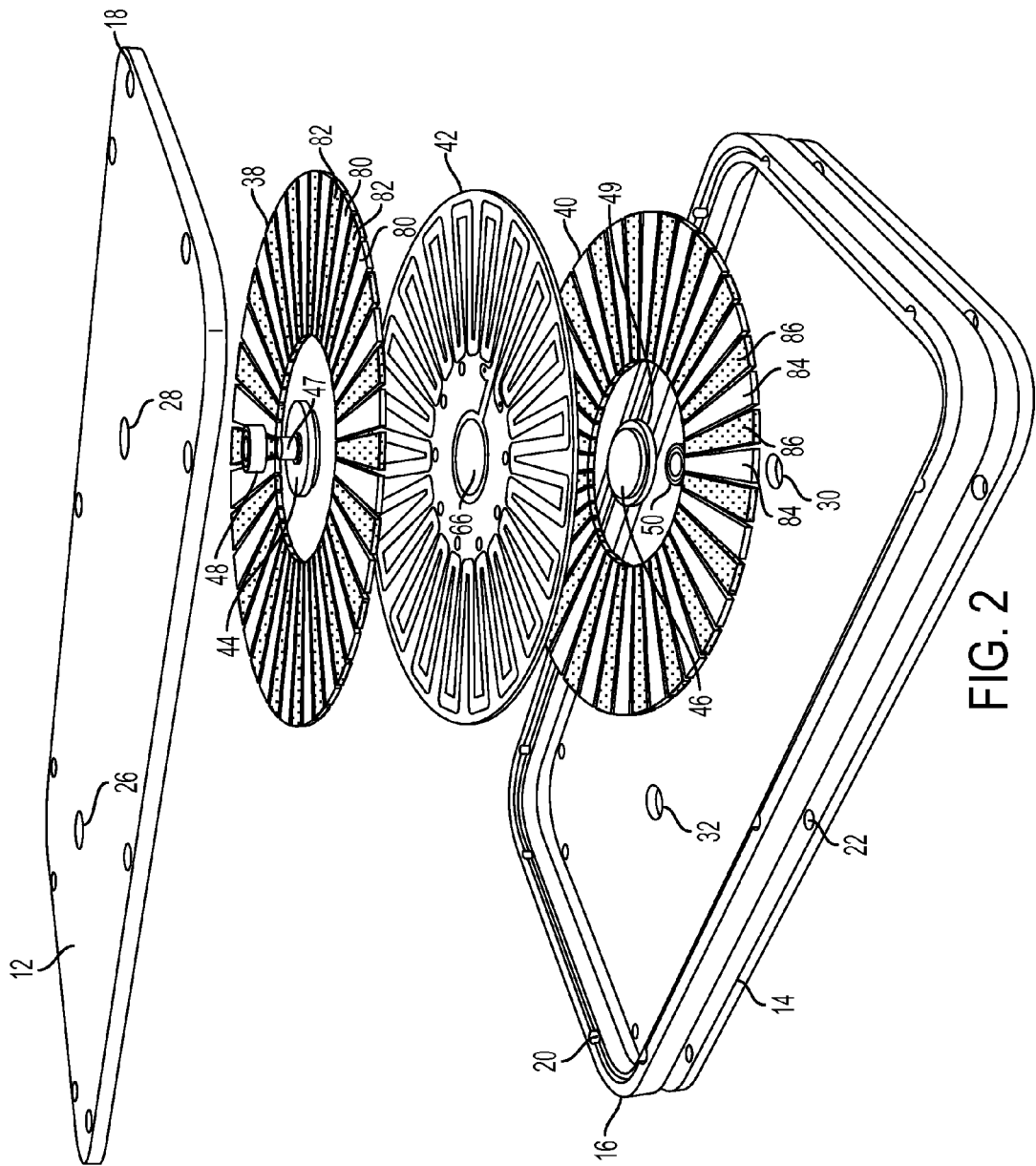
FIG. 2 is an exploded view of an alternative embodiment of the generator of FIG. 1.
Figure 3B:
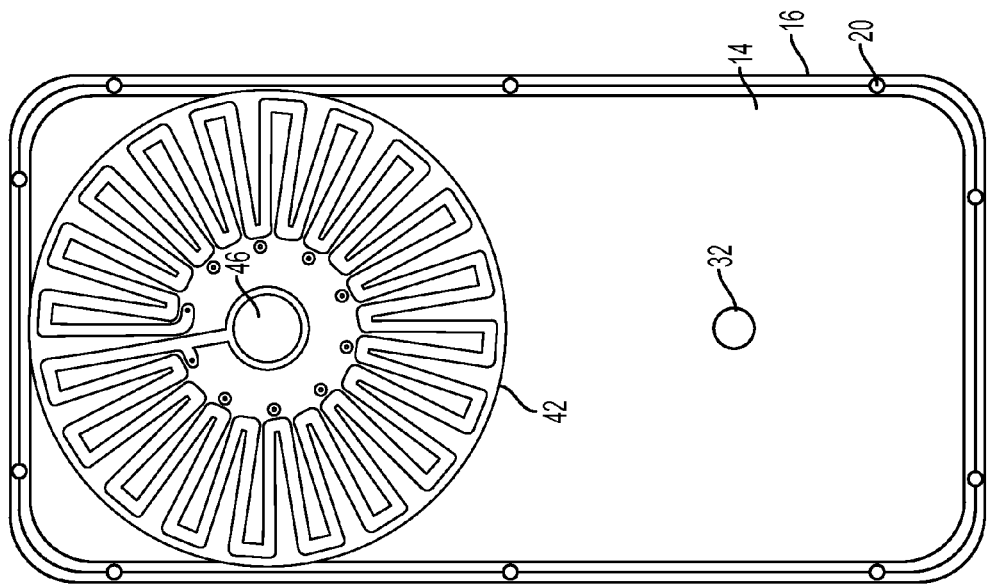
FIG. 3B is a plan view of an inner surface of an exemplary second plate of the generator of FIG. 1.
Figure 3A:
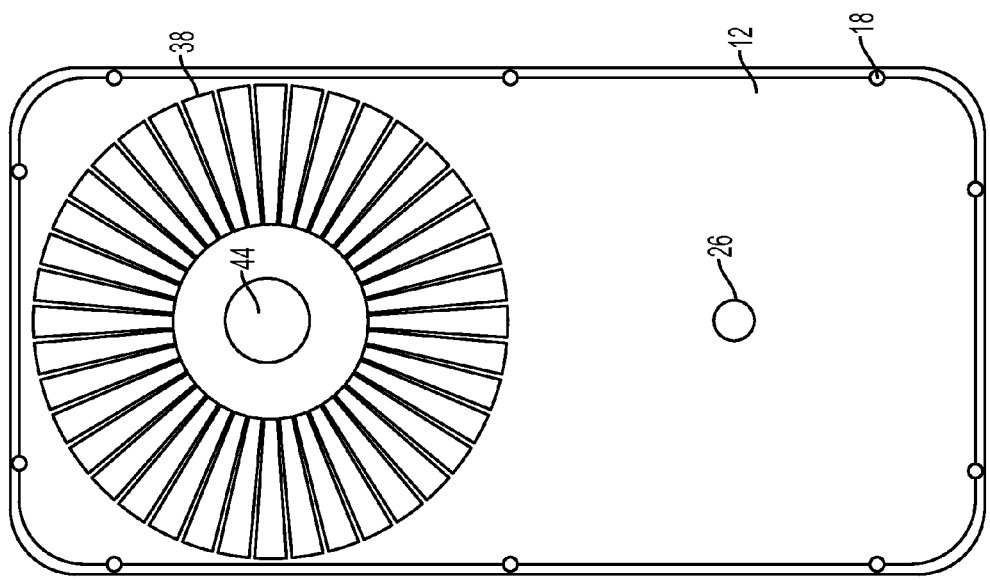
FIG. 3A is a plan view of an inner surface of an exemplary first plate of the generator of FIG. 1.

The rotor 42 can be rotatably mounted between the plates 12, 14 via a first axle 44 and first bearing 48, and a second axle 46 and second bearing 50. As shown further in FIGS. 1-2, the first axle 44 can have a projection 47 that extends through the first bearing 48 and the first bearing 48 can be fixedly positioned within a hole 28 in the first plate 12. Similarly, The second axle 46 can have a projection 49 that extends through the second bearing 50 and the second bearing 50 can be fixedly positioned within a hole 30 in the second plate 14, as shown in FIG. 2. The first and second axles 44, 46 can be fixed to the rotor 42 via a central opening in the rotor 42 such that the rotor 42 and the axles 44, 46 rotate together with the projections 47, 49 rotating within the bearings 48, 50. The axles 44, 46 do not touch to avoid a short circuit. The axles and/or bearings can comprise ball bearings to facilitate low-friction rotation.

The magnet arrays 38, 40 can comprise a plurality of individual magnets arranged in a circular pattern. The magnets can comprise rare earth magnets, for example grade 42 or grade 52 Neodymium. The number of magnets in each array can vary depending on the size of the magnets and the size of the plates and other factors. Some embodiments can comprise about 40 individual magnets in the first array 38 and 40 in the second array 40. The magnets can have a trapezoidal shape, as shown in FIGS. 1-2, or a rectangular shape, wedge shape, or any other suitable shape.

In some embodiments, the plates 12, 14 can comprise magnet-shaped indentations (not shown) on the inner surface for receiving the magnets. The magnets can be secured in the indentations using an adhesive and/or a covering layer of material that holds the magnets in their respective positions around the circular arrays. The magnets have a radial dimension and a circumferential dimension in the plane of rotation of the rotor 42, as well as a thickness dimension along the rotation axis direction. The thickness dimension can be relatively small, giving the magnets a plate-like shape with first and second major surfaces perpendicular to the thickness dimension.

Each of the magnets has a permanent positive, or north, pole and a permanent negative, or south, pole. The positive and negative poles are at opposite ends of the thickness dimension, with the polarity of each magnet being opposite the polarity of the two adjacent magnets in the same array. For example, in FIGS. 1-2, the first circular array of magnets 38 comprises a first group of magnets 80 that can have a positive pole at the major surface facing the rotor 42 and a second set of magnets 82 that have a negative pole at the major surface facing the rotor 42. The first group 80 alternates with the second group 82, such that the polarity of each magnet is opposite the two adjacent magnets. The second array of magnets 40 has a similar arrangement, with the first group of magnets 84 having a first polar orientation and the second group 86 having the opposite polar arrangement.

Figure 6:
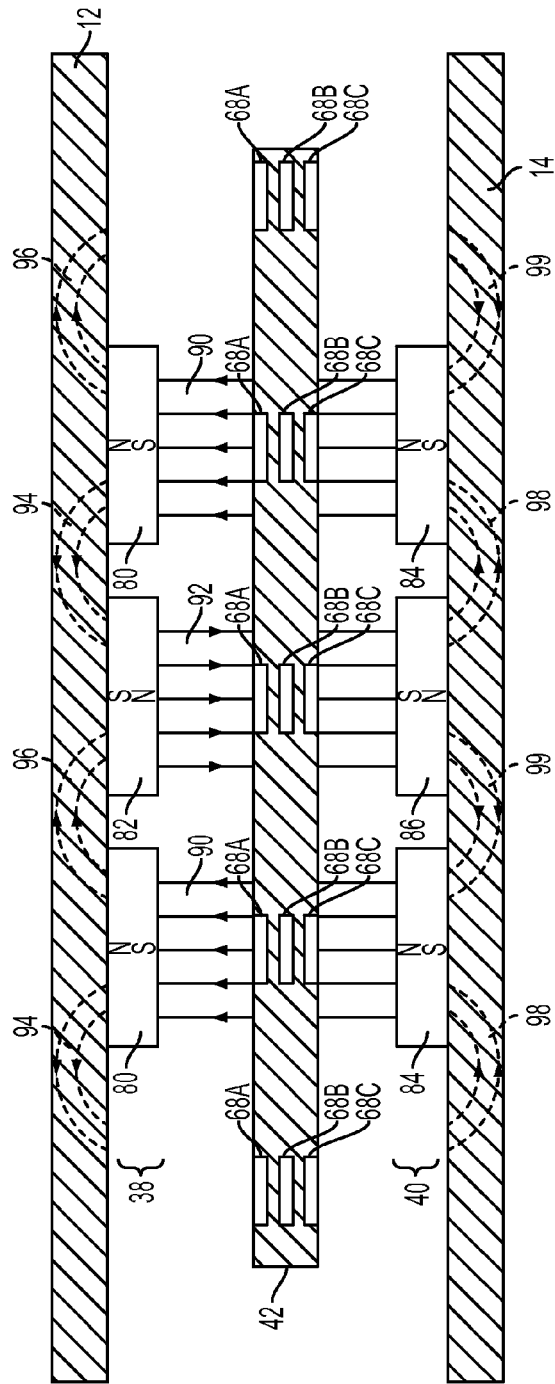
FIG. 6 is a cross-sectional view showing magnetic flux fields between the plates, magnets and conductors of the generator of FIG. 1.

As shown in FIG. 6, each pair of magnets aligned opposite each other across the rotor 42 can have the same polar alignment. For example, as illustrated in FIG. 6, the magnets 80 fixed to the first plate 12 each have a north pole facing the plate 12 and a south pole facing the rotor 42. The magnets 84 fixed to the second plate 14 that are aligned directly opposite from the magnets 80 have a south pole facing the second plate 14 and a north pole facing the rotor 42. The south poles of the magnets 80 and the north poles of the magnets 84 face each other and create a magnetic flux 90 in the space between the magnets. Similarly, the magnets 82 fixed to the first plate 12 and the aligned magnets 86 fixed to the second plate 14 have opposite poles facing each other and create a magnetic flux 92, opposite the flux 90, in the space between the magnets 82 and 86. Each magnet is attracted to the magnet opposite it on the other side of the rotor 42. In some embodiments, the distance between the magnets and the rotor can be from about 0.05 inches to about 0.20 inches. In some embodiments, the thickness of the first magnet array, the rotor, and the second magnet array can be about 0.1 inches.

The plates 12, 14 can be made of a magnetically conductive material (e.g., steel), and can be configured to conduct the flux between the adjacent magnets to create the arced flux fields 94 and 96 in the first plate 12 and the flux fields 98 and 99 in the second plate 14. The plates 12, 14 can be about 1/32 of an inch thick in some embodiments, and can comprise other materials in addition to the magnetically conductive material, for insulation, structure, aesthetics, and/or other purposes.

Figure 4:
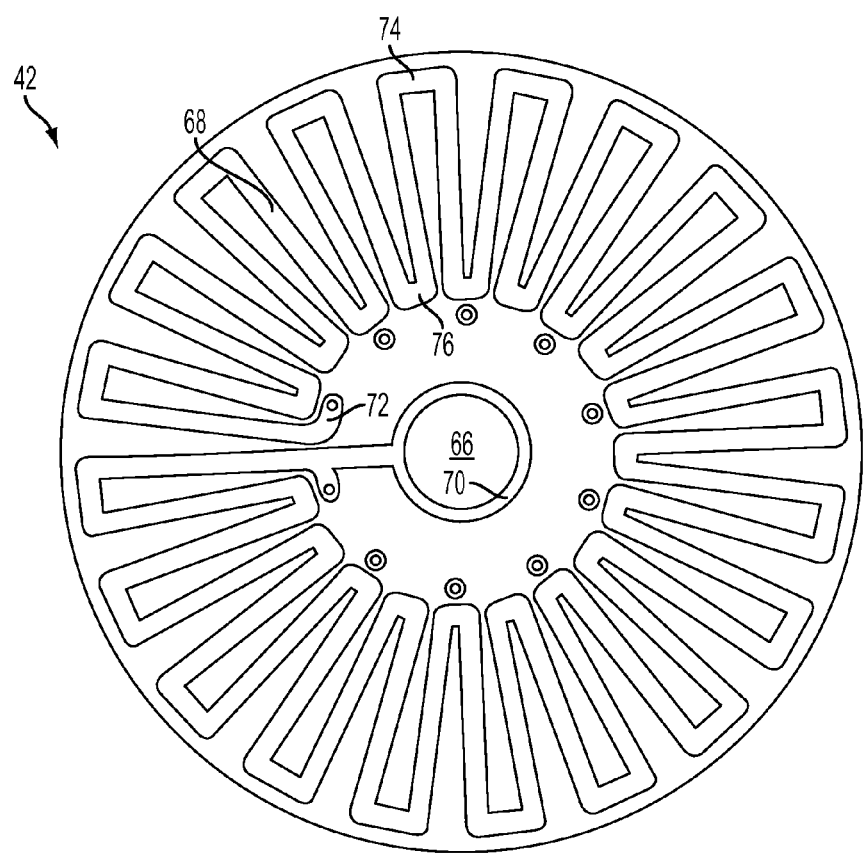
FIG. 4 is a plan view of a rotor of the generator of FIG. 1.

Referring now to FIGS. 4 and 6, the rotor 42 can comprise multilayered printed circuit board (PCB) having thereon a printed circuit 68. A top layer of the printed circuit is shown in FIG. 4. Each layer comprises a series of serpentine conductive pathways, or traces, that extend back and forth between an outer perimeter 74 and an inner perimeter 76 that is spaced apart from a central opening 66. The traces can be comprised of copper or other electrically conductive material. In some embodiments, the rotor 42 can have from about three to about ten layers of such traces. For example, in the exemplary embodiment of FIG. 6, the rotor 42 has three layers of conductive pathways 68A, 68B, and 68C. Each layer can be connected to the adjacent layers with vias, such as the via 72 shown in FIG. 4, that pass axially through the rotor 42 such that all the traces in all the layers form one long conductive pathway from the bottom layer to the top layer. At the bottom and top layers, the ends of the conductive pathway can terminate at the central ring 70 that encircles the central opening 66.

Figure 5:
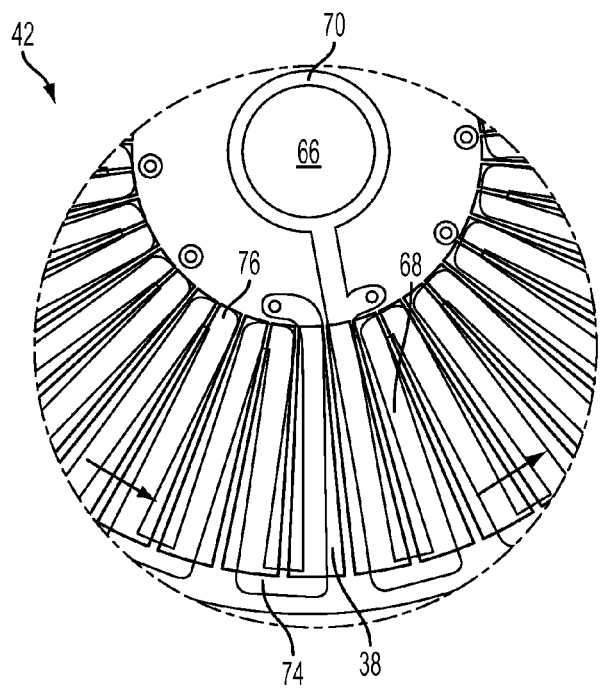
FIG. 5 is a fragmentary view illustrating rotational motion of the rotor relative to an array of magnets of the generator of FIG. 1.

As the rotor 42 spins, alternating electric current is generated in the conductive pathway as the serpentine trace segments pass though the alternating magnetic flux fields, as shown in FIGS. 5 and 6. The amplitude of this current can depend on many factors, including the speed of rotation of the rotor, the overall length of the printed circuit 68, the power and number of the magnets, etc. The current can be conducted from the central ring terminals 70 of the rotor 42, through the axles 44 and 46, through the plates 12, 14, and/or through additional circuitry of the generator, such as the PCB 125 of FIG. 14.

Thus, the axles 44, 46 can be comprised of electrically conductive metal, such as steel or copper, and can serve dual purposes of structural support and electrical conduction. Similarly, the plates 12, 14 can serve three functions: structural support, electrical conduction, and magnetic flux conduction.

Figure 7:
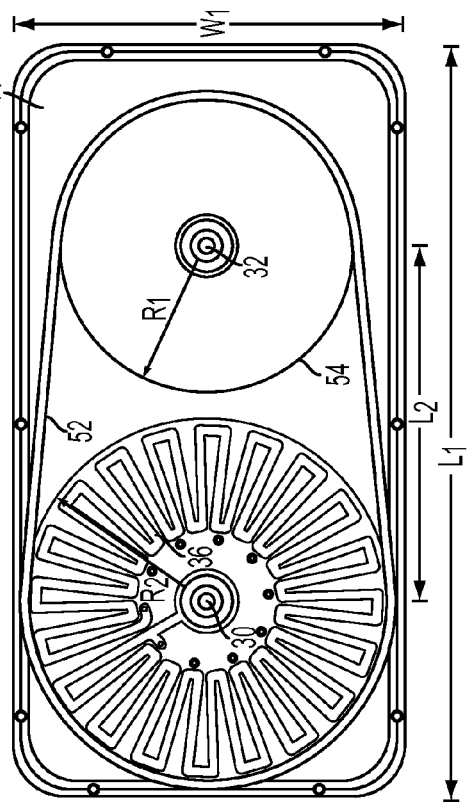
FIG. 7 is a plan view of the generator of FIG. 1 illustrating an exemplary belt-driven torque transfer system.

The rotor 42 can be driven mechanically by a variety of means. For example, as shown in FIG. 7, the rotor 42 can be driven by a capstan, chain, or belt 52 that is coupled to a drive wheel 54 mounted within the enclosure. The drive wheel 54 can have an axially extending projection that extends upward through an opening in the first plate 12 and is coupled to source of torque input. As shown in FIG. 1, the drive wheel 54 can be mounted rotatably via the projection 56 and an axle 60 coupled to respective bearings 58 and 62 positioned in respective openings 26 and 30 in the plates 12, 14.

In some embodiments, the rotor 42 can be driven by mechanical means such as a direct drive system, a gear system such as the gear assembly 152 described below, or other torque transfer mechanisms. Regardless of the particular mechanical means, the input torque can be manipulated to control the RPM of the rotor 42. A relatively slow RPM of the torque input can be converted to a higher RPM for the rotor 42. For example, torque input resulting in about 90 RPM can be converted by the mechanical torque transfer means to about 1350 RPM for the rotor 42. Thus the torque can be stepped down by a factor of about 1/15 in that case. In some embodiments, an exemplary range of speed of the rotor 42 can be from about 1000 RPM to about 2500 RPM, though a desired rotor rotation speed can be about 1500 RPM depending on several factors, including the desired voltage output of the generator.

The generator 10 can further comprise a torque input means, such as the torque input member 150 of FIG. 13 described below. The torque input means can comprise a mechanical turning mechanism, such as a shaft coupled to the projection 56 and positioned outside of the plates 12, 14. Such a shaft can be manually rotated, or can be rotated by another mechanism, such as a wind-driven device, water-driven device, or solar powered device.

In some embodiments, the generator 10 can comprise an indicator, such as an LED or LCD display (not shown), that indicates the RPM of the torque input means and/or the voltage/current output of the generator. In one example, a display can comprise a number representing RPM, and in another example the display can comprise plural bars like a conventional reception indicator on a cell phone. All the bars being lit up can indicate sufficient RPM to provide a specified voltage or current output.

In alternative embodiments, the generator 10 can comprise plural rotating rotors, each having its own corresponding pair of magnet arrays on either side of the rotor and fixed to the two plates. Each rotor can be rotated together by a linking torque transfer mechanism. The plural rotors can be arrayed in a coplanar orientation between two plates to maintain the thin form factor of the generator. In general, regardless of the number of rotors, the generator 10 as described can be scaled to any size to produce any desired voltage output to adapt to any other device. In alternative embodiments, the rotor can comprise a magnet array or arrays and the plates can comprise conductors or windings such that the magnet arrays spin with the rotor and the windings remain stationary for generating electrical power. In some embodiments, the generator can comprise electrical circuitry that manipulates the generated AC current, as further described with respect to FIG. 14.

As shown in FIG. 7, an exemplary length $L_1$ of the generator 10 can be about 3 inches to about 6 inches, an exemplary width $W_1$ of the generator can be about 1 inch to about 3 inches, and an exemplary distance $L_2$ between the torque input axis and the axis of the rotor can be about 1 inch to about 4 inches. The radius $R_1$ of the drive wheel 54 and the radius $R_2$ of the magnetic arrays/rotor can be any size less than $W_1$.

Figure 8:
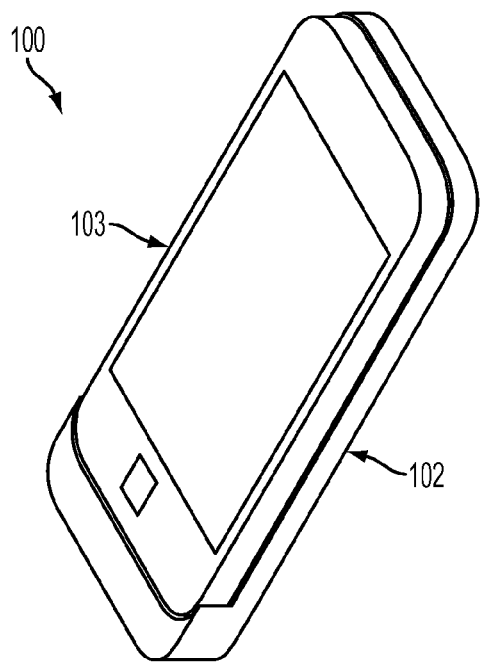
FIG. 8 is an isometric view of a second embodiment of an electricity generator combined with a mobile electronic device.
Figure 9:
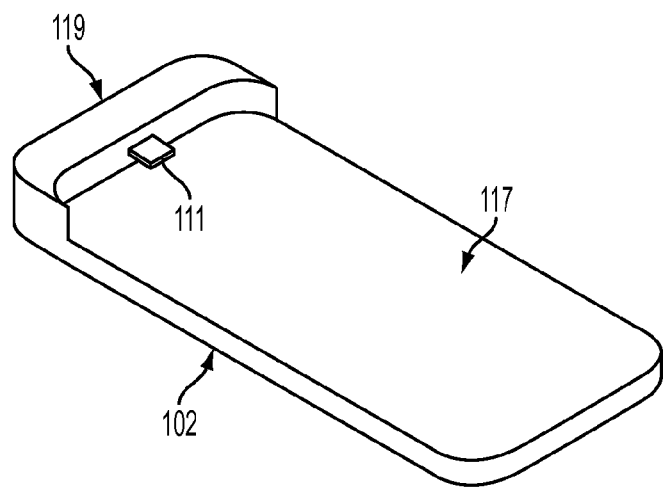
FIG. 9 is an isometric view of the generator of FIG. 8.

Referring now to FIGS. 8-9, there is shown another embodiment of a generator 100 for providing power to a portable electronic device. The generator 100 can comprise an enclosure or case 102 configured to attach directly to a portable electronic device 103, such as a mobile phone (e.g. an iPhone® by Apple Inc.), a tablet computer (e.g., an iPad by Apple Inc.), a laptop computer, a GPS device, and/or any other portable, rechargeable-battery device requiring a form of external power for charging. The case 102 can be generally rectangular, and can incorporate the components of the generator such that the overall thickness of the case 102 is about one half inch or less, providing a slim form factor and light weight. In some embodiments, the combined case 102 and mobile electronic device 103 can have a thickness of about one inch or less, allowing the generator 100 to be portable, hand-held and/or hand-operated. In some embodiments, the combined thickness of the case 102 and the mobile electronic device 102 can be about 0.8 inches.

As shown in FIG. 9, the case 102 can comprise a first portion 117 for housing the components of the generator and a second enlarged portion 119 for housing electronics associated with the generator such as rectifiers, filters, etc. The case 102 can also comprise a connector 111, such as a USB connector, an Apple Lightning® connector by Apple Inc., etc., for electrically and mechanically engaging the mobile electronic device. In some embodiments, the case can also include a torque input member 150 (see, e.g., FIG. 10) for rotating the components of the generator to generate electrical power. In this manner, a user can generate electrical power for charging a portable electronic device at any time when the device is connected to the generator.

In some embodiments, the case 102 can be configured to snap onto or slide onto or around the device 103, similar to the way conventional protective cases are attached to mobile phones. In alternative embodiments, the case 102 can be attached to the mobile device using a snap-on connection, a slide-over connection, a pivoting connection, magnetic connection, mechanical fasteners, adhesive, or other attachment means. In some embodiments, the case 102 can have a partially tubular structure that is configured to slide over a particularly shaped device, such as the device 103, to become directly attached to the device. Additionally, the case can comprise one or more components or portions configured to be coupled together to receive or enclose the mobile electronic device. In alternative embodiments, the connector 111 can comprise a plug or other electrical connector that is pivotably or flexibly attached to the rest of the generator such that the connector 111 can be connected to the device with the case of the generator at an angle, such that the case can pivot into attachment with the body of the mobile electronic device with the connector 111 already connected. In other embodiments, the generator can be physically attached to the body of the mobile electronic device first, and then the connector 111 can pivot or move into connection with the device. Similarly, in other embodiments, the generator can employ a cord or other direct electrical or physical connection to charge the mobile electronic device.

Figure 10:
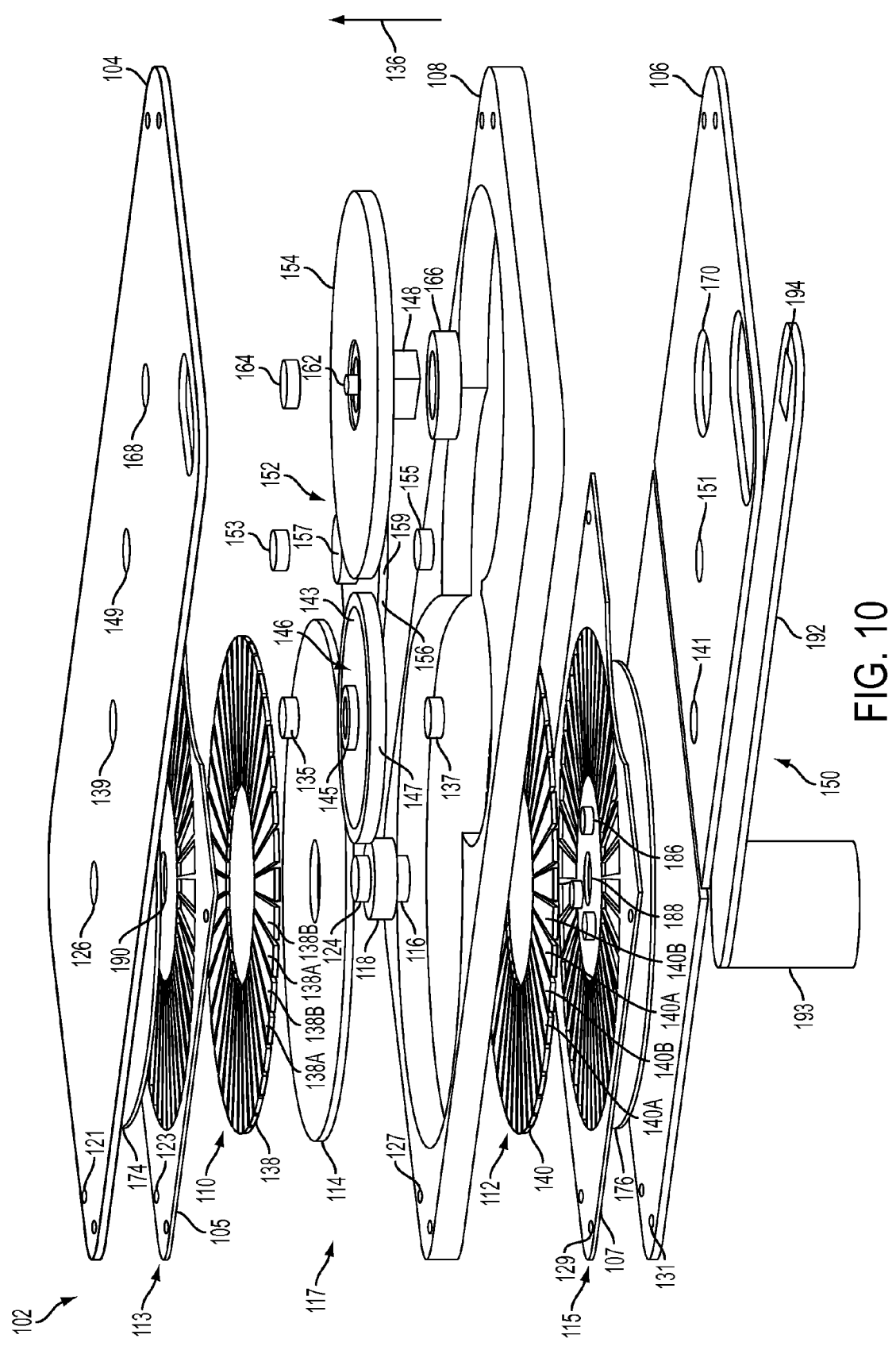
FIG. 10 is an exploded view of the generator of FIG. 8

Referring to FIG. 10, the first portion 117 of the case 102 of the generator can comprise a first plate 104, a second plate 106, and a separator 108 disposed between the two plates and configured to house components of the generator. The plates 104, 106 and the separator 108 can be secured to one another by fasteners (not shown) similar to the fasteners 24 of FIG. 1 disposed through holes 121, 131, and 127, respectively. The generator can comprise a rotor 114 disposed between first and second stators generally indicated at 113, 115 (see also FIG. 11). The stators 113, 115 can comprise a first circular array of permanent magnets 110 fixed on the inner surface of a first annular disk 174, and a second circular array of permanent magnets 112 fixed on the inner surface of a second annular disk 176, respectively, as shown in FIG. 11.

Figure 11:
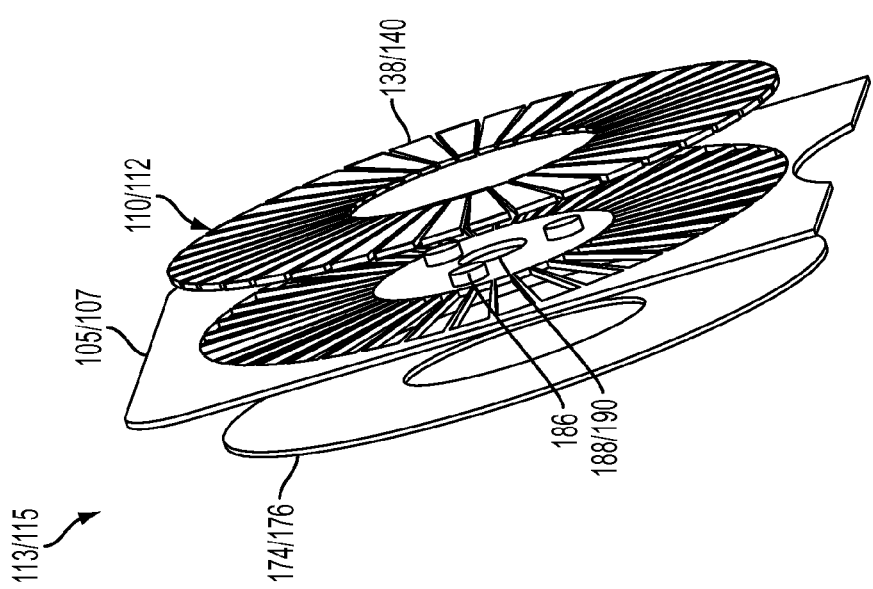
FIG. 11 is an exploded view of an exemplary stator of the generator of FIG. 8.

The magnet arrays 110, 112 can comprise a plurality of individual magnets 138, 140, respectively, arranged in a circular pattern, as shown in FIGS. 10 and 11. The magnets 138, 140 can comprise rare earth magnets, for example grade 42 or grade 52 Neodymium. The number of magnets in each array can vary depending on the size of the magnets and the size of the disks and other factors. Some embodiments can comprise about forty individual magnets 138 in the first array 110 and forty individual magnets 140 in the second array 112, similar to the embodiment of FIG. 1. The magnets can have a trapezoidal or wedge shape (see, e.g., FIGS. 3 and 11), or a rectangular shape, or any other suitable shape.

The stators 113, 115 can also comprise intermediate layers 105, 107 located on either side of the rotor 114, respectively, as shown in FIG. 11. The intermediate layers 105, 107 can include magnet-shaped openings 172 configured to receive the individual magnets 138, 140 of the first and second magnet arrays, respectively. In the embodiment shown in FIG. 10, the magnet-shaped openings 172 in the intermediate layers 105, 107 can be arranged in a circular fashion to define the circular arrays 110, 112. In this manner, the individual magnets 138, 140 can be retained on the surfaces of the annular disks 174, 176, respectively, helping to ensure that the magnets of the first and second arrays are accurately aligned with one another, and simplifying the manufacturing process. In some embodiments, the magnets 138, 140 can be fixed or bonded to the first and second annular disks, respectively. Alternatively, the magnets can be secured using an adhesive and/or a covering layer of material that holds the magnets to the first and second annular disks in their respective positions.

The magnets 138, 140 have a radial dimension and a circumferential dimension in the plane of rotation of the rotor 114, as well as a thickness dimension along the rotation axis direction indicated by arrow 136. The thickness dimension can be relatively small, giving the magnets a plate-like shape with first and second major surfaces perpendicular to the thickness dimension. For example, the thickness dimension of the magnets can be from about 0.02 inches to about 0.1 inches.

Each of the magnets has a permanent positive, or north, pole and a permanent negative, or south, pole. The positive and negative poles are at opposite ends of the thickness dimension, with the polarity of each magnet being opposite the polarity of the two adjacent magnets in the same array, similar to the embodiment of FIG. 1. For example, in FIG. 10, the magnets 138 of the first circular array 110 comprise a first group of magnets 138A that can have a positive pole at the major surface facing the rotor 114 and a second group of magnets 138B that have a negative pole at the major surface facing the rotor 114. The first group 138A alternates with the second group 138B, such that the polarity of each magnet is opposite the two adjacent magnets. The magnets 140 of the second array 112 have a similar arrangement, with a first group of magnets 140A having a first polar orientation and a second group 140B having the opposite polar arrangement.

In the embodiment shown, the first group of magnets 138A of the first array and the first group of magnets 140A of the second array have opposite polarities at the respective major surfaces facing the rotor 114 such that magnetic flux is conducted through the plane of the rotor 114 between the magnets, similar to the magnetic flux 90 of FIG. 6. Similarly, the second group of magnets 138B of the first array and the second group of magnets 140B of the second array also have opposite polarities at the respective major surfaces to conduct magnetic flux through the plane of the rotor 114 similar to magnetic flux 92 of FIG. 6.

The first and second annular disks 174, 176 can be fabricated from a magnetically conductive material such as steel. In this manner, the first and second annular disks 174, 176 can conduct magnetic flux between the adjacent magnets to create arced flux fields in the first annular disk 174 and arced flux fields in the second annular disk 176 similar to flux fields 94, 96 and 98, 99, respectively, of FIG. 6. The annular disks 174, 176 can be about 1/32 of an inch thick in some embodiments, and can comprise other materials in addition to the magnetically conductive material, for insulation, structure, aesthetics, and/or other purposes.

Figure 12:
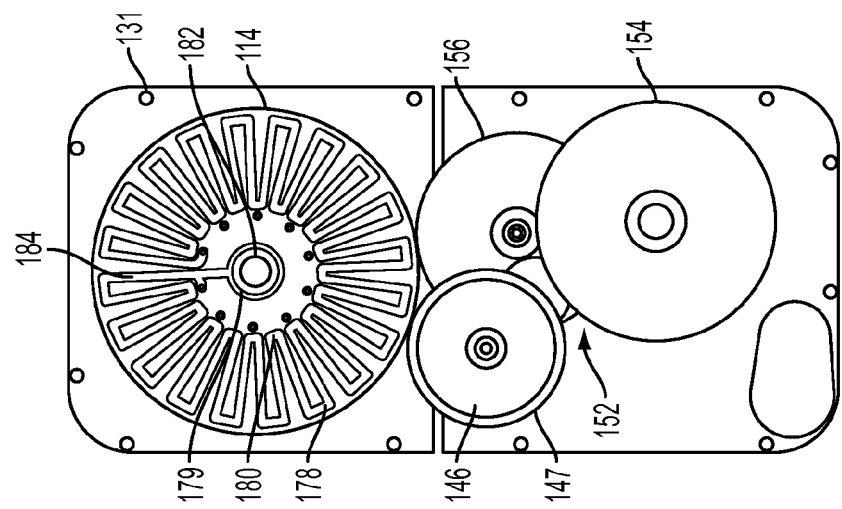
FIG. 12 is a plan view of a gear assembly and rotor of the generator of FIG. 8.

The rotor 114 comprises a multilayered printed circuit board (PCB) similar to the rotor 42 of FIG. 4. As shown in FIG. 12, each layer can comprise a series of serpentine conductive pathways, or traces, that extend back and forth between an outer perimeter 178 and an inner perimeter 180 that is spaced apart from the central opening 182. The traces can be comprised of copper or other electrically conductive material. In some embodiments, the rotor 114 can have from about three to about ten layers of such traces. Each layer can be connected to the adjacent layers with vias (not shown) that pass axially through the rotor 114 such that all the traces in all the layers form one long conductive pathway or printed circuit 184 from the bottom layer to the top layer. At the bottom and top layers, the ends of the conductive pathway can terminate at a central ring 179, similar to the rotor 42 of FIG. 1. As the rotor 114 spins, alternating electric current is generated in the conductive pathway as the serpentine trace segments pass though the alternating magnetic flux fields, as shown in FIGS. 5-6. The amplitude of this current can depend on many factors, including the speed of rotation of the rotor, the overall length of the printed circuit 184, the power and number of the magnets, etc.

The rotor 114 can be rotatably mounted between the stators 113, 115 via a first axle 116 and a first bearing 118. The first axle 116 can have a projection 124 that extends through the first bearing 118, and the first axle 116 can be fixedly positioned within a hole 126 in the first plate 104. The first bearing 118 can be fixed to the rotor 114 via a central opening in the rotor 114 such that the rotor 114 and the bearing 118 rotate together about the first axle 116. The axle and/or bearing can comprise ball bearings to facilitate low-friction rotation. In alternative embodiments, the rotor 114 can be mounted between two axles and corresponding bearings in a manner similar to the embodiment of FIG. 1.

As shown in FIGS. 10-11, the intermediate layers 105, 107 comprise one or more brushes 186 configured to contact the rotor 114. In the embodiment shown in FIG. 11, each intermediate layer 105, 107 comprises three brushes 186 disposed at substantially equal intervals around the central openings 188, 190 of the intermediate layers. In this manner, the brushes 186 can conduct electrical power generated in the serpentine traces of the printed circuit 184 away from the rotor 114 and to additional circuitry of the generator shown in FIG. 14. By providing three substantially equally-spaced brushes on each stator, the rotor 114 can be evenly supported on both sides so as to avoid wobbling or precession of the rotor while in operation. In some embodiments, the intermediate layers 105, 107 can comprise printed circuit boards to facilitate conducting electrical power away from the rotor. In alternative embodiments, the rotor can be supported by conductive axles similar to the embodiment of FIG. 1.

Figure 13:
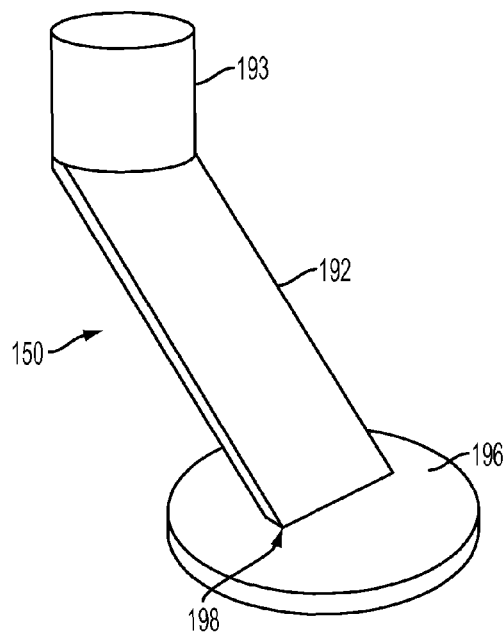
FIG. 13 is an isometric view of a torque input member of the generator of FIG. 8.

Referring to FIGS. 10 and 12-13, the rotor 114 can be driven mechanically by a capstan 146 having a plate-like large-diameter portion 143 and a cylindrical small-diameter portion 145 extending from both sides of the large-diameter portion. The edge of the large-diameter portion 143 of the capstan 146 can comprise an outer fitting 147, such as a rubber fitting, that can be frictionally engaged with the edge of the rotor 114 such that rotation of the capstan induces rotation of the rotor. The capstan 146 can be interconnected with a torque input member 150 (see, e.g., FIGS. 10 and 13) through a torque-reducing, speed-increasing apparatus such as a gear assembly 152, as shown in FIG. 12.

In some embodiments, the gear assembly 152 can include three gear stages. As shown in FIG. 10, a first gear stage 154 can be coupled directly to the torque input member 150 such that the first gear stage 154 rotates at the same frequency as the torque input member. The lever arm 192 of the torque input member 150 can have a rectangular opening 194 configured to receive a rectangular projection 148 of the first gear stage 154. The first gear stage 154 can be supported by a bearing 166 configured to receive the rectangular projection 148, and by a bearing 164 configured to receive a first gear stage axle 162. Each of the bearings 164, 166 can be positioned in respective openings 168, 170 in the plates 104, 106.

The first gear stage 154 can be coupled to a second gear stage 156 having a first, cylindrical small-diameter portion 157 and a second, plate-like large-diameter portion 159, as shown in FIGS. 10 and 12. The second gear stage can be located adjacent the first gear stage such that the small-diameter portion 157 of the second gear stage is coupled to or engaged with the edge of the first gear stage. In some embodiments, the small-diameter portion 157 of the second gear stage can comprise gear teeth and can multiply the rotational frequency of the first gear stage. The second gear stage 156 can also be supported by bearings 153, 155 configured to be positioned in respective openings 149, 151 in the plates 104, 106.

The large-diameter portion 159 of the second gear stage 156 can be coupled to the small-diameter portion 145 of the capstan 146, which can also function as a third gear stage. The small-diameter portion 145 of the capstan 148 can comprise about 50 teeth, and can thereby multiply the rotational frequency of the second gear stage by a factor of about 2.5. Thus, the three gear stages of the gear assembly can multiply the rotational frequency of the torque input member by a factor of from about 10:1 to about 24:1. In some embodiments, the gear assembly can multiply the rotational frequency of the torque input member by a ratio of about 15:1. As shown in FIG. 10, the capstan 146 can be supported by bearings 135, 137 configured to be positioned in respective openings 139, 141 in the plates 104, 106. In alternative embodiments, the rotor can be driven by a belt or chain similar to the embodiment of FIG. 1.

Referring now to FIG. 13, an exemplary embodiment of the torque input member 150 can comprise a lever arm 192 and a handle portion 193 configured to be gripped by the hand of a user. In some embodiments, the torque input member can be configured to be pivotable between a first use position (FIG. 13) and a second non-use position (not shown). In this manner, a user can move the torque input member from the non-use position to the use position for charging the mobile electronic device, and then move the torque input member back into the non-use position after imparting a desired amount of electrical power to the device. In some embodiments, the torque input member 150 can be mounted to a rotating circular base 196 (FIG. 13), which can be incorporated into either of the first or second plates 104, 106. In some embodiments, the torque input member can be configured to stow or fold into the plate such that it is flush with the plate when in the non-use position. In some embodiments, the torque input member can have an operating radius of from about one inch to about six inches or more, and can be adjustable in length.

In the embodiment of FIG. 13, the rotating circular base 196 can be coupled to the first gear stage 154 of the gear assembly such that rotation of the torque input member induces rotation of the gear assembly and hence of the rotor, as described above. In some embodiments, the circular base can be incorporated into the first or second plates 104, 106. In some embodiments, the lever arm 192 of the torque input member can comprise a beveled region 198 configured such that when the torque input member is in the use position, the bevel rests on the circular base such that the torque input member is supported at a particular angle, such as an angle of about 150 degrees relative to the horizontal. In this manner, the torque input member can extend above the knuckles and fingers of a user's hand, allowing the user to freely rotate the torque input member while gripping the generator. In alternative embodiments, the torque input member can be configured to act as a stand for the device when the device is coupled to the generator. In this manner, the device can be maintained at a comfortable viewing angle when positioned on a horizontal surface, such as a desk.

Figure 14:
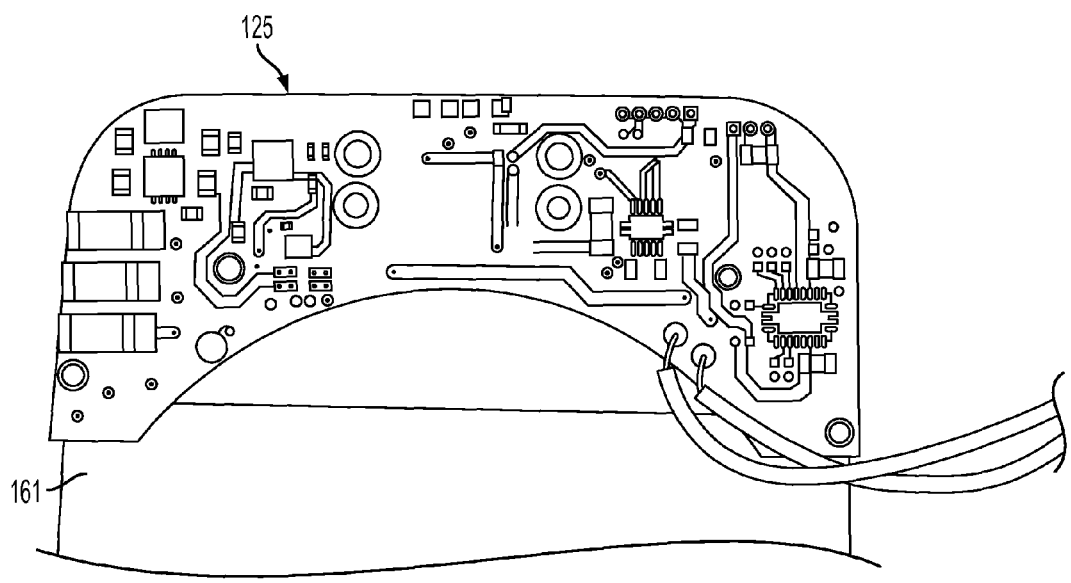
FIG. 14 is a plan view of a printed circuit board of the generator of FIG. 8.

Referring to FIG. 14, the generator can comprise a PCB 125. The PCB 125 can be in electrical communication with the rotor 114 via the brushes 186, and can be configured to perform AC-to-DC conversion and filtering functionality for charging the mobile electronic device. Thus, in some embodiments, the PCB 125 can comprise one or more AC-to-DC conversion devices such as silicon diodes and/or full wave silicon rectifiers to enable the output of DC current. The PCB 125 can also comprise pulse-smoothing devices, such as filters, to convert pulsating amplitudes of generated current into a more consistent, even amplitude output. For example, in some embodiments, the electrical power generated in the rotor 42 comprises alternating current with amperage of from about 200 to about 1000 milliamps and voltage of from about three volts to about seven volts at the peaks. The PCB 125 can convert this alternating current into a continuous direct current output of about five volts and about 500 milliamps, or about 2.5 watts. In this manner, the PCB 125 can condition the electrical power output of the generator so as to mimic electrical power input from, for example, a conventional charger unit to trigger the charging routine of the mobile electronic device and enable charging. In some embodiments, the PCB 125 can also comprise circuitry configured to enable the mobile electronic device to connect with a computer or other device. For example, the PCB 125 can comprise a connector (not shown), such as a USB connector, that can enable the mobile electronic device to connect with a computer to transfer data or receive electrical power for charging while the device is coupled to the case of the generator.

As shown in FIG. 14, the generator 100 can also comprise a battery 161 for augmenting the current and/or voltage output of the generator. For example, in some embodiments, the mobile electronic device may require a current and/or voltage output to initiate charging that is higher than the current and/or voltage output that the generator can produce with manual torque input. Thus, in some embodiments, the generator 100 can be configured such that the electrical power output of the rotor 114 is directed to the battery 161 after conditioning by the PCB 125. The battery 161 and the associated charging circuitry then selectively charges the mobile electronic device.

Thus, in an exemplary charging routine, a mobile electronic device requires five watts of electrical power at one amp in order to initiate charging. The generator 100, receiving manual torque input from a user at from about 60 RPM to about 100 RPM, can produce about 2.5 watts of DC power output. The electrical power output from the generator is transmitted to the battery 161. The mobile electronic device draws power from the battery 161, thereby discharging the battery 161. When the battery 161 can no longer supply the voltage and/or current levels required by the device, charging of the device temporarily ceases. The battery 161 is charged by the power input from the generator and, once sufficiently charged such that it can deliver the power requirements of the device again, resumes charging the device. In this manner, the generator 100 can be configured to charge devices with power requirements that exceed the direct power output of the generator. In alternative embodiments, the power output of the generator can be supplied directly to the mobile electronic device where the generator can meet the power requirements for charging the device. The battery 161 can be located in, for example, the first or second portions 117, 119 of the case 102.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

As used herein, the terms "a", "an" and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A," "B," "C," "A and B," "A and C," "B and C" or "A, B and C."

As used herein, the term "coupled" generally means physically or electrically coupled or linked and does not exclude the presence of intermediate elements between the coupled items absent specific contrary language.

In view of the many possible embodiments to which the principles of the disclosed inventions may be applied, it should be recognized that the illustrated embodiments are only preferred examples of the inventions and should not be taken as limiting the scope of the inventions. Rather the scope of the inventions is at least as broad as the following exemplary claims.

We claim:

1. A manually powered generator for charging a mobile device, comprising:

a first magnet array, the first magnet array comprising a plurality of magnets arrayed in an annular formation on a first surface;

a second magnet array, the second magnet array comprising a plurality of magnets arrayed in an annular formation on a second surface positioned opposite the first surface;

a torque input member; and a rotor disposed between the first and second magnet arrays, the rotor comprising a printed circuit board including a plurality of planar layers, each of the plurality of planar layers comprising a serpentine trace of conductive material extending radially inwardly and outwardly in a continuous manner between a respective inner perimeter and a respective outer perimeter in a serpentine shape so as to form a series of interconnected peaks and valleys around a circumference of the respective planar layer, the respective inner perimeters of each serpentine trace being spaced radially outwardly from a central opening defined in the rotor, the serpentine traces of material being interconnected between the planar layers by one or more vias to form a single conductive pathway, the one or more vias being located adjacent the inner perimeters of the respective serpentine traces, the plurality of planar layers including a top layer and a bottom layer, the top and bottom layers including respective terminals surrounding the central opening and electrically connected to the serpentine traces of the top and bottom layers;

wherein the generator is configured to be incorporated into a handheld case that can be coupled to the mobile device.

2. The generator of claim 1, wherein the rotor is configured to be rotatably driven by the torque input member.

3. The generator of claim 1, wherein rotation of the rotor causes electrical current to be generated in the conductive material.

4. The generator of claim 1, wherein the magnets of the first and second magnet arrays are arranged in alternating polarity.

5. The generator of claim 1, wherein the magnets of the first and second magnet arrays are rare-earth magnets.

6. The generator of claim 1, wherein the first and second surfaces are electrically and magnetically conductive.

7. The generator of claim 1, wherein the axis of rotation of the rotor is substantially perpendicular to a major surface of the mobile device.

8. The generator of claim 1, further comprising a mechanical assembly configured to interconnect the torque input member and the rotor, the mechanical assembly being configured to step up the revolutions per minute of the torque input member such that the rotor rotates at a higher frequency than the torque input member.

9. The generator of claim 8, wherein the mechanical assembly comprises a gear assembly.

10. The generator of claim 8, wherein the ratio of the rotational frequency of the rotor to the rotational frequency of the torque input member is from about 15:1 to about 24:1.

11. The generator of claim 1, wherein the electrical current output of the generator is from about 200 milliamps to about 1000 milliamps.

12. The generator of claim 1, wherein the voltage output of the generator is from about three volts to about seven volts.

13. The generator of claim 1, wherein the generator comprises circuit elements configured to convert an alternating current input from the generator having variable voltage peaks to a direct current output of substantially constant voltage.

14. The generator of claim 1, wherein the thickness of the first magnet array, the rotor, and the second magnet array is from about 0.1 inch to about 0.5 inch.

15. The generator of claim 14, wherein the thickness of the first magnet array, the rotor, and the second magnet array is about 0.1 inch.

16. The generator of claim 1, wherein the thickness of the magnets of the first and second magnet arrays is from about 0.02 inch to about 0.1 inch.

17. The generator of claim 1, wherein the rotor rotates about one or more conductive axles, and the electricity generated in the rotor is conducted away from the rotor to the mobile device through the conductive axles.

18. The generator of claim 1, wherein the electricity generated in the rotor is conducted away from the rotor to the mobile device by one or more brushes.

19. The generator of claim 1, wherein the generator has an overall thickness less than one centimeter and is configured to output at least five volts of continuous electrical output via manual torque input from the torque input member.

20. A case for a handheld mobile electronic device, comprising:
an electrical generator that is manually powered and configured to transfer electrical power to the mobile electronic device, the electrical generator comprising:
a first magnet array, the first magnet array comprising a plurality of magnets arrayed in an annular formation on a first surface;
a second magnet array, the second magnet array comprising a plurality of magnets arrayed in an annular formation on a second surface positioned opposite the first surface;
a torque input member; and
a rotor disposed between the first and second magnet arrays, the rotor comprising a printed circuit board including a plurality of planar layers, each of the plurality of planar layers comprising a serpentine trace of conductive material extending radially inwardly and outwardly in a continuous manner between a respective inner perimeter and a respective outer perimeter in a serpentine shape so as to form a series of interconnected peaks and valleys around a circumference of the respective planar layer, the respective inner perimeters of each serpentine trace being spaced radially outwardly from a central opening defined in the rotor, the serpentine traces of material being interconnected between the planar layers by one or more vias to form a single conductive pathway, the one or more vias being located adjacent the inner perimeters of the respective serpentine traces, the plurality of planar layers including a top layer and a bottom layer, the top and bottom layers including respective terminals surrounding the central opening and electrically connected to the serpentine traces of the top and bottom layers; and
wherein the electrical generator is incorporated into the case such that the thickness of the case is substantially less than or equal to the thickness of the mobile electronic device.

21. The case of claim 20, wherein the case further comprises a battery, the battery being in communication with the electrical generator and the mobile electronic device.

22. The case of claim 21, wherein the generator is configured to provide electrical power to the battery, and the battery is configured to provide electrical power to the mobile electronic device.

23. The case of claim 20, wherein the case is configured to be releasably installed around the mobile electronic device.

24. The case of claim 23, wherein the case is configured to be in electrical communication with the mobile electronic device when the case is installed around the mobile electronic device.

25. The case of claim 23, wherein the total thickness of the case and the mobile electronic device is from about one half inch to about one inch.

26. The case of claim 25, wherein the total thickness of the case and the mobile electronic device is about 0.8 inch.

27. The case of claim 20, wherein the thickness of the case is from about 0.2 inch to about 0.5 inch, the length of the case is from about three inches to about eight inches, the width of the case is from about two inches to six inches, and the power output of the generator is greater than two watts.

28. The case of claim 20, wherein the case is coupled to the mobile electronic device by one or more cords.

29. A method of charging a mobile device, comprising:
providing a case for a mobile device comprising an electrical generator in communication with the mobile device, the electrical generator comprising:
a first magnet array, the first magnet array comprising a plurality of magnets arrayed in an annular formation on a first surface;
a second magnet array, the second magnet array comprising a plurality of magnets arrayed in an annular formation on a second surface positioned opposite the first surface;
a torque input member; and
a rotor disposed between the first and second magnet arrays, the rotor comprising a printed circuit board including a plurality of planar layers, each of the plurality of planar layers comprising a serpentine trace of conductive material extending radially inwardly and outwardly in a continuous manner between a respective inner perimeter and a respective outer perimeter in a serpentine shape so as to form a series of interconnected peaks and valleys around a circumference of the respective planar layer, the respective inner perimeters of each serpentine trace being spaced radially outwardly from a central opening defined in the rotor, the serpentine traces of material being interconnected between the planar layers by one or more vias to form a single conductive pathway, the one or more vias being located adjacent the inner perimeters of the respective serpentine traces, the plurality of planar layers including a top layer and a bottom layer, the top and bottom layers including respective terminals surrounding the central opening and electrically connected to the serpentine traces of the top and bottom layers;
rotating the torque input member;
multiplying the rotational frequency of the torque input member with the gear assembly;
rotating the rotor adjacent the magnets at the multiplied rotational frequency to generate electrical current; and
conducting the electrical current away from the rotor and into the mobile device;

wherein the electrical generator has a thickness of less than one centimeter and is configured to generate a continuous electrical output of about five watts.

\* \* \* \* \*